US006051831A

United States Patent [19]

Köster

[11] Patent Number: 6,051,831

[45] Date of Patent: Apr. 18, 2000

[54] HIGH-MASS DETECTOR WITH HIGH MASS-RESOLUTION FOR TIME-OF-FLIGHT MASS SPECTROMETERS

[75] Inventor: Claus Köster, Lilienthal, Germany

[73] Assignee: Bruker Daltonik GmbH, Bremen, Germany

[21] Appl. No.: 08/949,374

[22] Filed: Oct. 14, 1997

[30] Foreign Application Priority Data

Oct. 28, 1996 [DE] Germany ............................ 196 44 713

[51] Int. Cl.[7] .............................. G01D 59/44; H01J 49/00

[52] U.S. Cl. ........................... 250/281; 250/282; 250/283

[58] Field of Search ..................................... 250/281, 282, 250/287, 283

[56] References Cited

U.S. PATENT DOCUMENTS

| | | | |
|---|---|---|---|
| 4,988,867 | 1/1991 | Laprade | 250/281 |
| 4,988,868 | 1/1991 | Gray | 250/281 |
| 5,202,561 | 4/1993 | Giessmann et al. | 250/281 |
| 5,463,218 | 10/1995 | Holle | 250/283 |
| 5,777,325 | 7/1998 | Weinberger et al. | 250/287 |

FOREIGN PATENT DOCUMENTS

| | | |
|---|---|---|
| 4018923 | 12/1991 | United Kingdom . |
| 2253302 | 9/1992 | United Kingdom . |
| 2278494 | 11/1994 | United Kingdom . |
| 4316805 | 11/1994 | United Kingdom . |

*Primary Examiner*—Bruce C. Anderson

[57] ABSTRACT

The invention relates to ion detectors for heavy ions with high mass resolution and high sensitivity usable in time-of-flight mass spectrometers. It relates to sensitive measuring methods for large masses in the range of about ten thousand to several hundred thousand atomic mass units. Specifically it relates to the conversion of large ions into smaller ions, which can then be detected with standard ion detectors for ions of smaller and average masses.

The invention consists of a thin multichannel plate, such as is normally used for secondary-electron multiplication, used as a conversion device, in combination with a standard ion detector. However, in contrast to normal secondary-electron multiplier operation, it is operated at reversed polarity in order to produce large numbers of low-weight positive ions by a self-contained amplification process engaging secondary electrons accelerated in backward direction. This device and operating method leads to a reduction in signal width and offers high sensitivity for large ions.

10 Claims, 3 Drawing Sheets

HIGH-MASS DETECTOR WITH HIGH MASS-RESOLUTION FOR TIME-OF-FLIGHT MASS SPECTROMETERS

FIELD OF INVENTION

The invention consists of a thin multichannel plate, such as is normally used for secondary-electron multiplication, used as a conversion device, in combination with a standard ion detector. However, in contrast to normal secondary-electron multiplier operation, it is operated at reversed polarity in order to produce large numbers of low-weight positive ions by a self-contained amplification process engaging secondary electrons accelerated in backward direction. This device and operating method leads to a reduction in signal width and offers high sensitivity for large ions.

PRIOR ART

Detection of large ions with masses exceding 10,000 atomic mass units by the otherwise so elegantly applicable secondary-electron multiplier (SEM) presents great difficulties. Thus for example, a bioorganic or polymer molecule ion with a mass of m=50,000 u, is made up of about 5,000 atoms, mostly carbon and hydrogen atoms. Even at an acceleration up to 30 kilovolts, only 6 electron volts of kinetic energy is carried on average by each atom. (30 kilovolts currently represent a practical limit for the usability of high voltages in commercial mass spectrometers). For larger ions in the mass range from 100,000 to 1,000,000 atomic mass units, the ratios are even more extreme. The generation of secondary electrons at a surface is essentially dependent on the velocity of the impinging ions. The heavy ions fly very slowly and are hardly able to release any secondary electrons upon impact. If such a secondary electron is released anyway, it is often bound by the electron affinity of one of the resulting neutral of positively charged fragments. Therefore, one mostly avoids this conversion to electrons by using the positive or negative fragment ions of smaller mass which are generated in a smaller number upon impact in order to further amplify the signal.

The prior art is presented, for example, in the U.S. Pat. No. 5,463,218 (Holle).

The heavy ions can either be shot directly at a secondary-electron multiplier (SEM), for example a multichannel plate, or as described in the quoted patent, on a conversion electrode to split them up into smaller particles. The resulting positive or negative ions (or the only occasionally resulting electrons) can then be further amplified with a subsequent SEM. Both methods present considerable disadvantages, which shall be presented briefly in the following.

A standard method is to add a conversion dynode, onto which the heavy ions impact, in front of a detector suited for ions of smaller masses. These ions have been normally accelerated to about 30 kilovolts, whereby singly charged ions gain a total kinetic energy of 30 kiloelectronvolts. During the abrupt impact on the conversion diode, the large ion stops its movement and the suddenly released kinetic energy is transferred into inner energy. This causes the ion to explode into a bunch of smaller particles because the chemical bonds between the atoms only correspond to energies of about 5 electronvolts each. This process then produces many small particles of which a very few are positively charged and a very few others are negatively charged; most of the particles are neutral.

The conversion dynode can be designed (as in the above quoted patent) as a "Venetian blind." This Venetian blind consists of a flat device perpendicular to the flight direction of the ions consisting of a series of barely overlapping metal stripes, each standing at about a 45° angle to the flight direction, thus forming an impenetrable barrier for the ions. Behind the Venetian blind, there is an accelerating field which draws out the resulting ions from the Venetian blind and accelerates them toward the ion detector. Since this Venetian blind can hardly be less than about 1 millimeter thickness in practice, there is a limitation to the mass resolution due solely to the various flight lengths of the ions until impact. For a flight path of 1 meter, the time resolution is limited to $R_t$<1,000 (=1 m flight path/1 mm flight path differences by thickness), and the mass resolution therefore, which is only half as large according to the laws of physics, is limited to $R_m$<500. However, it is even more serious that the ions practically come to a standstill upon impact and that the particles to be detected must be reaccelerated. Because of the various masses of the ions to be detected, and particularly because of the differing access of the accelerating field to the ions within the Venetian blind, a strong temporal smearing of the signal is generated. This is substantially greater than the temporal smearing caused by differing flight lengths.

In U.S. Pat. No. 5,202,561 (Giessmann, Hillenkamp and Karas), a method is described by which the conversion dynode forms a plane surface precisely perpendicular to the flight direction of the ions. In front of the conversion dynode, there is a grid which pulls the small ions back away from the conversion dynode after conversion and transfers a more or less uniform energy to them. In addition, there is a magnetic cross field in front of the conversion dynode which forces the removed ions onto a circular path which allows them to impact on a multichannel plate after a 180° deflection for further amplification via secondary electrons. Here a slit can be arranged after a 90° deflection which filters out ions of undesirable masses and allows only the ions of a specific mass to continue flying. This provides a relatively equal flight time for the converted ions to the detector. However this complicated arrangement drastically limits the sensitivity without effectively increasing the resolution in practice, since the ions generated by a kind of explosion already possess a spread of initial velocities which cannot be compensated for.

The heavy ions can however be impacted at a secondary electron multiplier, for example a multichannel plate. The thereby released electrons are further multiplied in the small channels of the multichannel multiplier plate in the known manner, and finally are measured after postamplification. Besides relatively low sensitivity, there is an intolerable smearing of the signal on the declining edge ("tailing") for reasons unexplained up to now.

The practically achievable resolution is limited for ions of a mass of m=66,000 amu to resolution values of $R_m$<100.

OBJECTIVE OF THE INVENTION

It is the objective of the invention to find a detector for ions of large masses which can be used in time-of-flight mass spectrometers of very high resolution. The detector must combine a good temporal resolution with a high sensitivity for heavy ions.

BRIEF DESCRIPTION OF THE INVENTION

It is the basic idea of the invention to use a multichannel plate (such as is used for secondary-electron multiplication) as a conversion device in front of a standard low mass ion detector. This conversion multichannel plate must have a high yield of secondary electrons. However, this multichannel plate must be poled in such a way that positively charged fragments are accelerated in the forwards direction. These ions then release secondary electrons which are accelerated backwards, multiply thereby by further wall collisions, and fragment and ionize further neutral particles originating from the heavy ion. This self-amplifying process generates a large number of light-weight positive ions which, after suitable acceleration, produce an intense signal with narrow signal width in the subsequent standard low mass ion detector. For the detection of low mass ions, the polarity of the conversion multichannel plate can be reversed.

DETAILED DESCRIPTION OF THE INVENTION

Figure 1A:
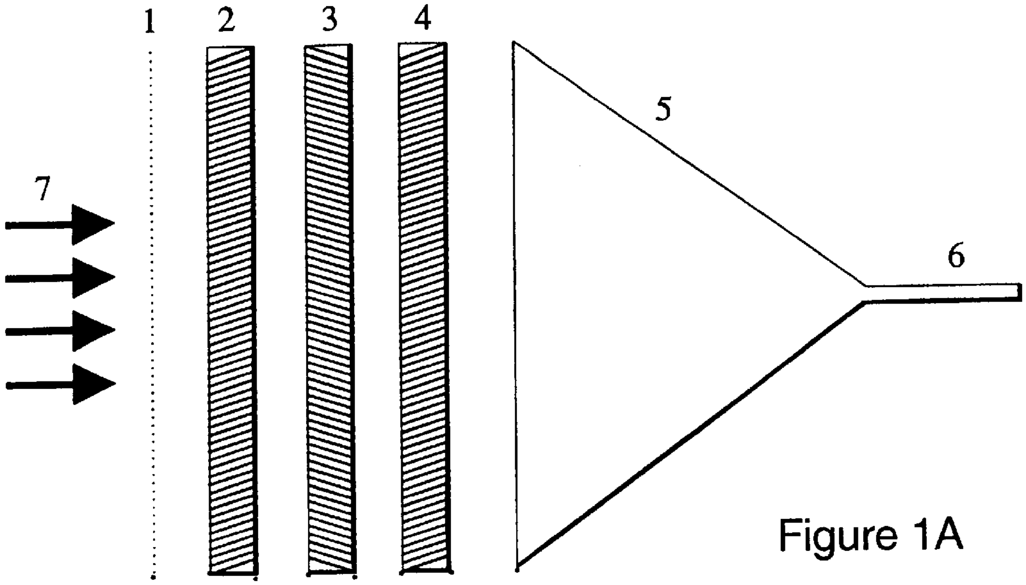
FIG. 1A, shows a schematic representation of the ion detector according to this invention.

The small channels in the conversion multichannel plate have a diameter between 4 and 50 micrometers. These channels, which mostly are arranged at a slight angle to the flight direction of the ions, promise a very low penetration depth for the arriving heavy ions, and therefore little temporal smearing. One millimeter thick multichannel plates with small channels of 25 micrometers diameter and an angle of 8° have proven to be especially favorable. However, in particular, the skimming impact of the heavy ions onto the walls of the small channels does not lead to complete deceleration of the resulting particles. A small cloud of neutral fragments is formed which for the most part still have the flight velocity of the heavy ions. The positive particles occurring in a small number upon impact are then immediately drawn out of the cloud of fragments (which continues to fly) by the strong electric field inside the channel that is generally greater than $10^6$ V/m and are accelerated into the channel. Very light particles, in particular protons, can be accelerated to such high velocities that they themselves become able to release secondary electrons. Collisions of these particles with the channel wall lead to the release of secondary electrons which then are accelerated backwards. These are multiplied in further wall collisions and pepper the cloud of neutral fragments in large number. These electrons, having an average kinetic energy of about 100 electron volts, ionize and further fragment neutral particles through electron collisions. Hence neutral fragments are ionized, and larger fragments are further fragmented, resulting in a large cloud of light-weight, positively charged ions.

This device for an active, self-amplifying conversion has considerable advantages:

(1) the penetration depth for large ions, which generate a large amount of time smearing when decelerating and reaccelerating, is much smaller than with the venetian blinds, which have a seemingly similar function, and amounts to only about 100 micrometers;

(2) the resulting fragments are not even completely decelerated, but retain a substantial portion of their velocity in the direction of the following ion detector; in this way the variation of penetration depths hardly leads to any temporal smearing of the ion signal;

(3) the positive ions are immediately removed from the cloud, protected from neutralizing recombination and accelerated toward the next detector; and (4) further neutral fragments are ionized and fragmented in great number in a self-amplifying manner by the resulting secondary electrons.

This conversion device can then be joined with great success to normal secondary-electron multipliers such as are used for the detection of lighter ions.

Again, the multichannel plates are especially suitable for this since they practically form a level surface and thus offer favorable conditions for fast detection without time smearing. As detector for light-weight ions, normally two coupled multichannel plates are used in an arrangement by which the declination angles of the small channels of the first and second plate each stand in the opposite direction (so-called “chevron” arrangement). This arrangement reduces saturation and hold-up times for the small channels in the multichannel plate.

The conversion multichannel plate can however also be coupled with only one multichannel plate coupled with a scintillator, the light flashes of which, triggered by electrons escaping from the multichannel plate, can be detected by a photomultiplier. This arrangement offers the advantage that a fiber-optic light guide can be used between the scintillator and the photomultiplier which can also bridge large voltage differences. It is therefore possible to operate the detector at a high potential as well, without needing to operate the highly sensitive electronic amplifier for the ion current signals at high potential. Operation of the photomultiplier is also possible outside the vacuum system, whereby usually the light guide forms a part of the vacuum wall.

Besides a high mass resolution, this instrument also offers a very high sensitivity for large ions, as desired. Because of the ion amplification, the sensitivity for heavy-weight ions even exceeds the sensitivity for small ions by far.

This effect, so desirable for large ions, is a handicap if the same detector is also to be used for small ions. It is therefore a further idea of the invention to reverse the polarity of the conversion multichannel plate for highly sensitive detection of smaller and average ions. Normal secondary electron multiplying operation with forward acceleration of the electrons is then obtained for the first channel plate.

PARTICULARLY FAVORABLE EMBODIMENTS

A favorable embodiment is shown in FIG. 1A. Operation for highly sensitive detection of higher as well as lower ion masses is described below. The conversion plate is one millimeter thick and has small channels with a diameter of 25 micrometers and a slant of 8° out of the forward direction of the ions. The voltage across the plate is about 1 to 2 kilovolts.

Mode (B) for heavy ions: the ions flying in ion beam (7) first pass through the grid (1) which is at the potential of the flight path (ground potential here). They then enter into the conversion device (2), in which a single heavy ion explodes into a cloud of smaller particles and is finally transformed into a large number of small, positively charged ions through the mechanism described for this invention. These ions are accelerated towards the first multichannel plate (3) of the light-weight ion detector in which they release secondary ions. These electrons multiply in a known manner in the two multichannel plates (3) and (4), whose slightly angled small channels are in a so-called chevron arrangement. After exiting the multichannel plate (4), the electrons encounter the Faraday collector (5) which is adjusted to the high frequency components of the ion beam by its geometric form as a wave guide (the surrounding counterelectrode is not shown), and from which the electron current is guided via the outlet (6) to an electronic amplifier (not shown).

Mode (C) for small ions: the three multichannel plates (2), (3) and (4) are switched in a row equipolarly. The ions (7) experience postacceleration between the grid (1) and the first channel plate (2), and release secondary ions in the first channel plate (2) which multiply in the three channel plates (2), (3) and (4) and are measured via the Faraday collector (5).

Figure 1B:
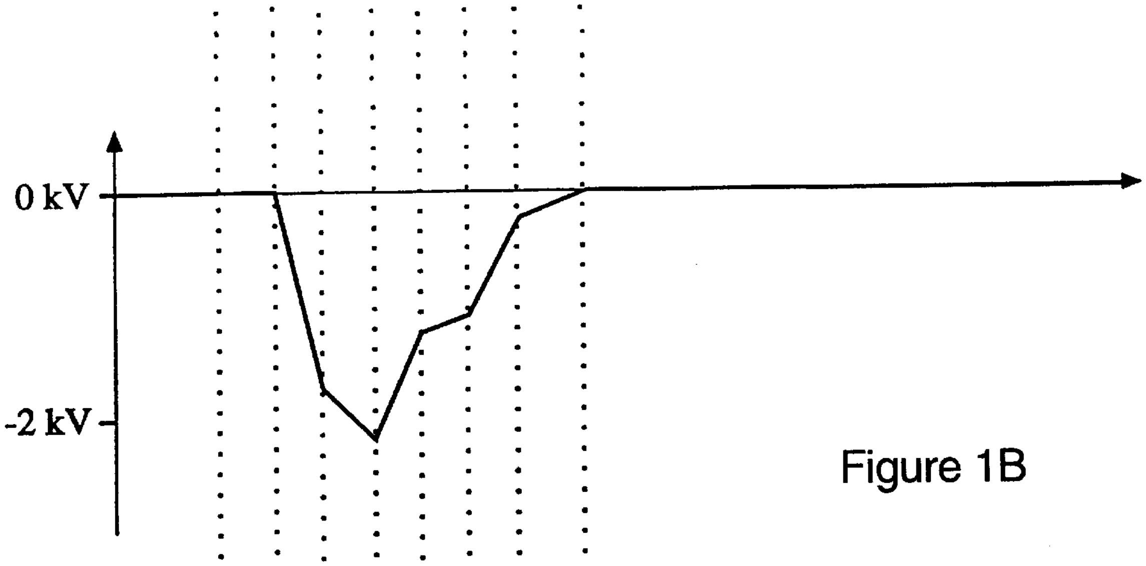
FIG. 1B exhibits the electrical potentials used for the detection of high masses.

Even more favorable than the potential distribution shown in FIG. 1B is a distribution by which a high voltage difference of about 5 to 10 kilovolts prevails between the conversion plate (2) and multichannel plate (3), in order to postaccelerate light ions. In this way time smearing is again reduced and the secondary electron yield is increased.

The potential characteristics must be generated by a corresponding electrical supply unit. Here the voltages must be adjusted within the range of about 1 to 10 kilovolts, so that the multichannel plates provide the desired amplification of electrons and the desired accelerations are achieved for the particles during transfer from one plate to the other. Since the potential differences of the potential distribution 1B and 1C may all be kept proportional to one another, one single supply unit can be used for the provision of only one adjustable voltage, the partial voltages for the potential characteristics being generated by voltage dividers. Here it is even possible to produce all potentials necessary for both operating modes 1B and 1C with one single voltage divider, and to switchover only the two potentials for operation of the converted channel plate (2).

Figure 3:
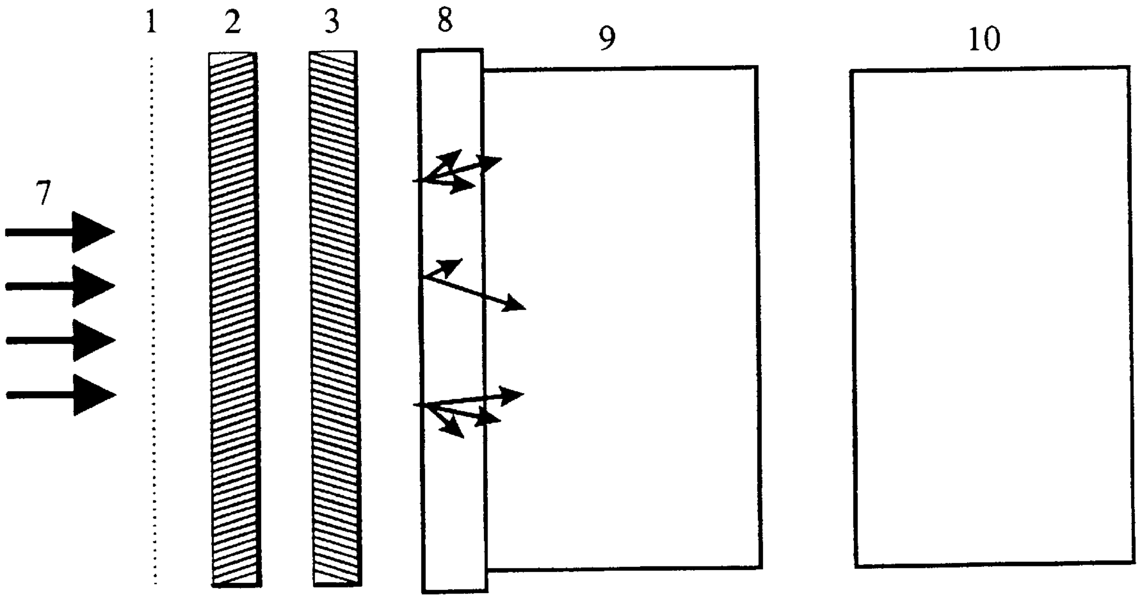
FIG. 3 shows a different heavy ion detector according to this invention, with scintillator (8), fiber-optic light guide (9) and photomultiplier (10). The first stages function as in FIG. 1. The electrons from the second channel plate hit the scintillator (8) under acceleration and generate light flashes which are fed via a light guide (9) to a photomultiplier (10) for measurement.
Figure 4:
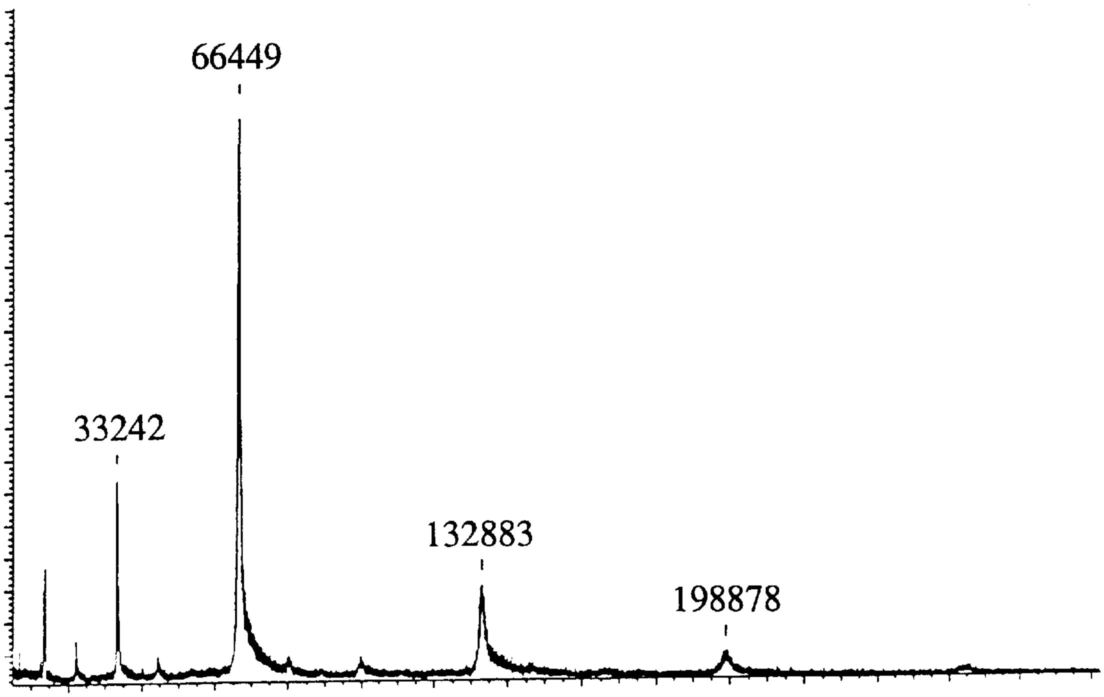
FIGS. 4 and 5 show two spectra of BSA (“bovine serum albumin”, m≈66,000 u) and its oligomers, scanned in the standard manner (FIG. 4) and with a detector according to this invention (FIG. 5). The resolution is limited in this case by adducts of matrix molecules, however the decline of decelerating smearing (tailing) is well visible.
Figure 5:
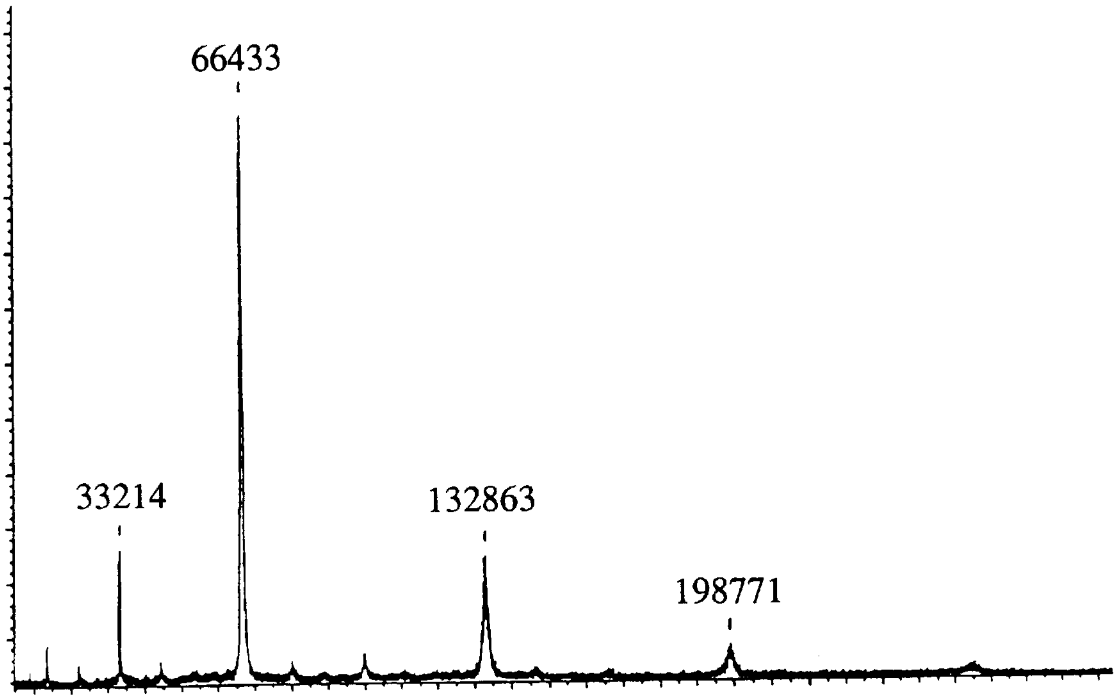

A further favorable embodiment is reproduced in FIG. 3. Here a high post-accelerating voltage can be switched between the grid (1) and the conversion plate (2), which feeds kinetic energy to the ions once again before their detection. The voltage for this can again be about 30 kilovolts; the kinetic energy of the ions can therefore be doubled without suffering an undesirable reduction in flight time. However, the voltage-supply unit for the voltages of the conversion device (2) and those of the electron-multiplying multichannel plate (3) must also be at the high potential. The electrons from the multichannel plate (3) are then accelerated onto a scintillator, the light flashes of which are measured via a light guide by a photomultiplier. The light guide can be passed through the wall of the vacuum system so that an enclosed photomultiplier can be used outside of the vacuum. The amplifier for the electron emission current from the photomultiplier is conveniently at ground potential.

Figure 1C:
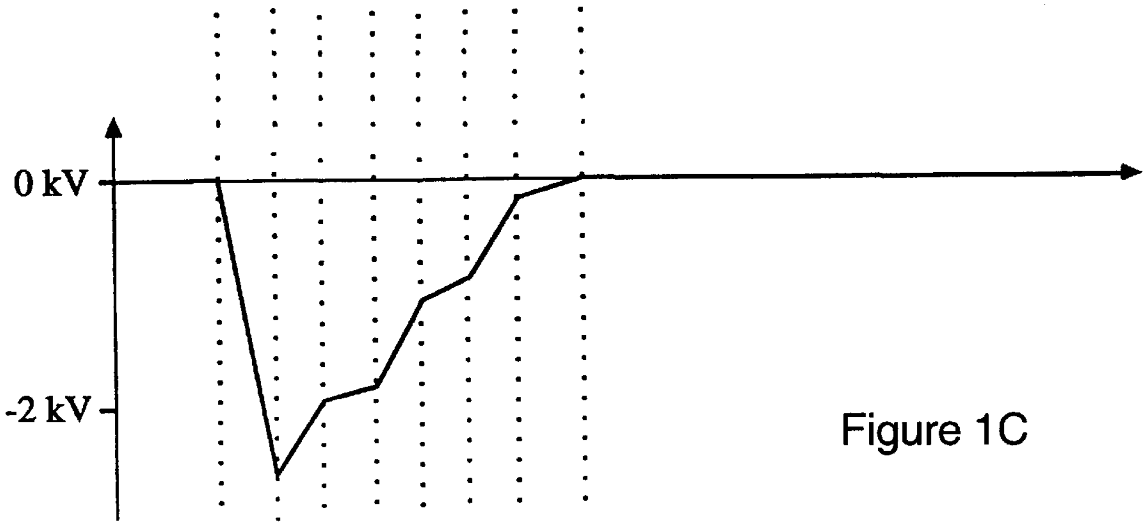
FIG. 1C shows the potentials for specific low mass detection. The potentials are generated favorably by a single voltage supply unit (not shown) and corresponding voltage dividers.
Figure 2:
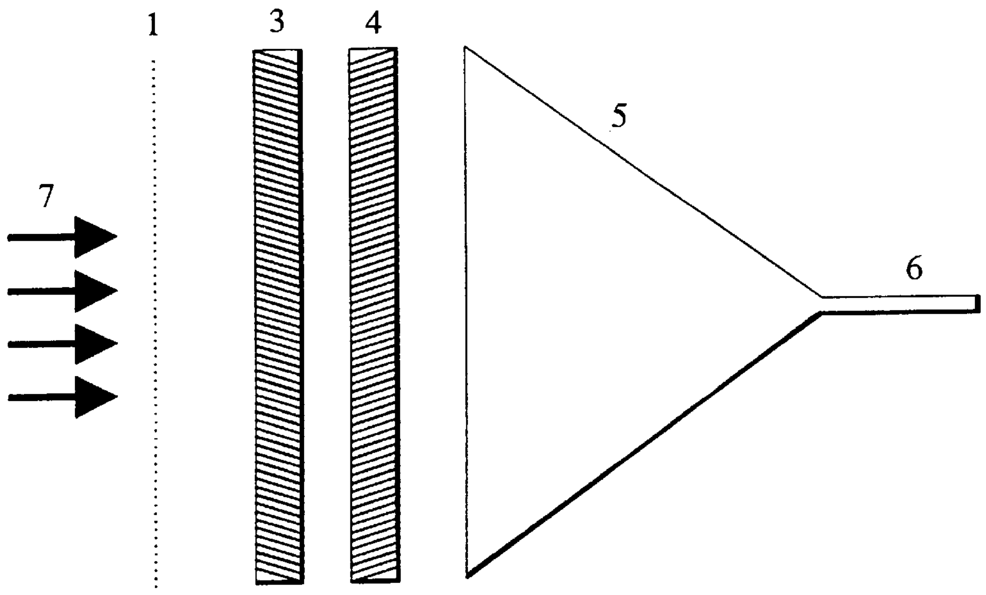
FIG. 2 shows a standard light ion detector with only two multichannel plates (3) and (4). If this ion detector is used for heavy ions, a very poor resolution results due to signal smearing (especially through “tailing”).

The devices which are shown schematically in FIGS. 1 and 3 are not completely presented, for reasons of clarity, with all isolators and holding elements. However, it is an easy task for a specialist in this field to complete the design particularly since the light ion detectors described are commercially available.

Other than the embodiments shown in FIGS. 1 and 3, there are many other embodiments which can be designed using different models of conventional light ion detectors. These are expressly included in the invention.

I claim:

1. A detection device for the detection of ions from an ion beam in a time-of-flight mass spectrometer, the detection device comprising:

(a) a conversion device capable of breaking up a heavy ion that is incident upon it so as to release a plurality of positive light ions, the conversion device comprising a voltage-supplied multichannel plate secondary-electron multiplier that has a first side upon which the heavy ions are incident, the first side having a higher voltage potential than that of an opposite side that faces away from the incident ions, such that positive fragment ions are accelerated through the channels and exit the multichannel plate through the second side, and secondary electrons generated within the multichannel plate are accelerated toward the first side; and (b) an ion detector that detects the ion fragments, the multichannel plate and the detector being separated by a flight region within which the ion fragments travel.

2. A detection device according to claim 1, wherein the voltage potential of the second side may be made temporarily higher than that of the first side for use in detecting relatively light ions.

3. A detection device according to claim 1, wherein the ion detector comprises a double multichannel plate.

4. A detection device according to claim 3, further comprising a voltage supply and a voltage divider connected to the voltage supply by which said voltage potentials for the conversion device are established.

5. A detection device according to claim 1, wherein the ion detector comprises a multichannel plate and a scintillator.

6. A detection device according to claim 5 further comprising an ion beam accelerator for accelerating the ion beam toward the conversion device.

7. A method of detecting ions from an ion beam, the method comprising the steps of:

(a) locating a first side of a conversion device in the path of the ion beam, the conversion device comprising a multichannel plate secondary-electron multiplier and being capable of breaking up a heavy ion that is incident upon it so as to release a plurality of positive light ions;

(b) locating an ion detector to a second side of the conversion device, such that the conversion device is located between the detector and the ion beam;

(c) applying a voltage potential to the multichannel plate such that positive ions inside the multichannel plate are accelerated toward the ion detector, and secondary electrons generated within the multichannel plate are accelerated toward its first side.

8. A method according to claim 7, wherein the voltage potential of the multichannel plate may be temporarily reversed to allow the detection of lighter ions in the ion beam.

9. A method according to claim 7, wherein the detector comprises a double multichannel plate.

10. A method according to claim 7, wherein the detector comprises a multichannel plate, a scintillator, a fiber-optic light guide and a photomultiplier.

* * * * *